US007890382B2

(12) United States Patent
Robb et al.

(10) Patent No.: US 7,890,382 B2
(45) Date of Patent: *Feb. 15, 2011

(54) RECURSIVE METHOD AND SYSTEM FOR ACCESSING CLASSIFICATION INFORMATION

(75) Inventors: Anne E. Robb, 221 S. Triplet Lake Dr., Casselberry, FL (US) 32707; Larry Fortna, Leesburg, FL (US); Ronald A Biritz, Casselberry, FL (US)

(73) Assignee: Anne E. Robb, Shelby, MI (US)

( * ) Notice: Subject to any disclaimer, the term of this patent is extended or adjusted under 35 U.S.C. 154(b) by 421 days.

This patent is subject to a terminal disclaimer.

(21) Appl. No.: 12/157,825

(22) Filed: Jun. 13, 2008

(65) Prior Publication Data

US 2008/0263461 A1 Oct. 23, 2008

Related U.S. Application Data

(62) Division of application No. 09/755,442, filed on Jan. 5, 2001, now Pat. No. 7,389,252.

(60) Provisional application No. 60/174,785, filed on Jan. 6, 2000.

(51) Int. Cl.
G06Q 10/00 (2006.01)
G06Q 30/00 (2006.01)
G06F 17/30 (2006.01)
B60G 17/018 (2006.01)

(52) U.S. Cl. .............................. 705/26; 705/27; 705/5; 701/37

(58) Field of Classification Search .................... 705/26, 705/27, 5

See application file for complete search history.

(56) References Cited

U.S. PATENT DOCUMENTS 4,992,940 A * 2/1991 Dworkin ...................... 705/26

(Continued)

FOREIGN PATENT DOCUMENTS

JP 0200024667 A 2/1999

(Continued)

OTHER PUBLICATIONS

"eBay Drives Into Automotive Category; New General and Collector Automotive Areas Brought Online With Kruse International" PR Newswire Aug. 30, 1999.*

(Continued)

*Primary Examiner*—Matthew S Gart
*Assistant Examiner*—Ashford Hayles
(74) *Attorney, Agent, or Firm*—Brian S. Steinberger; Law Offices of Brian S. Steinberger, P.A.

(57) ABSTRACT

A web based menu system that allows the users such as buyers and sellers to locate, purchase, and sell goods, items and services easily without any search queries. The knowledge base of the system increases with user interaction at variable levels. The database contains an orderly classification of goods and services throughout. Point-and-click technology can be used to navigate through a series of menus. The system can also respond to voice activation and recognition commands. At the web site, the user first selects a category followed by a selection of makes, items, or services called a Sub-Category that relate to the category. The system responds by displaying a uniform series of menus referred to as a "Fluidity of Taxonomy". This process repeats until the user reaches the finite end of the menu series. Next, the system completes the interaction based upon if the user is a buyer or a seller. For buyers, the database is accessed resulting in a list of ads based upon the user's accumulated menu selections. The user can filter and sort the presentation of ads based on various criteria and place requests for instant notification of subsequent new ad placements. Banner ads that are applicable to the buyers' area of interest are also presented by the system. For sellers, an input form for ad placement is presented based upon the user's accumulated menu selections. Sellers can also grow the database based on their menu selections and form input. The system can be used for retrieving any orderly classification of information.

20 Claims, 30 Drawing Sheets

Block Diagram

U.S. PATENT DOCUMENTS

| | | | | |
|---|---|---|---|---|
| 5,283,731 | A * | 2/1994 | Lalonde et al. | 705/1.1 |
| 5,592,375 | A * | 1/1997 | Salmon et al. | 705/7 |
| 5,706,434 | A * | 1/1998 | Kremen et al. | 709/218 |
| 5,724,521 | A * | 3/1998 | Dedrick | 705/26 |
| 5,745,882 | A * | 4/1998 | Bixler et al. | 705/26 |
| 5,774,873 | A * | 6/1998 | Berent et al. | 705/26 |
| 5,897,639 | A * | 4/1999 | Greef et al. | 1/1 |
| 5,909,670 | A * | 6/1999 | Trader et al. | 705/14.68 |
| 6,085,176 | A * | 7/2000 | Woolston | 705/37 |
| 6,282,517 | B1 * | 8/2001 | Wolfe et al. | 705/36 R |
| 6,360,216 | B1 * | 3/2002 | Hennessey et al. | 1/1 |
| 5,473,739 | A1 | 10/2002 | Showghi et al. | |
| 6,466,918 | B1 * | 10/2002 | Spiegel et al. | 705/27 |
| 6,473,739 | B1 * | 10/2002 | Showghi et al. | 705/26 |
| 6,484,149 | B1 * | 11/2002 | Jammes et al. | 705/26 |
| 6,880,750 | B2 * | 4/2005 | Pentel | 235/380 |
| 7,630,919 | B1 * | 12/2009 | Obrecht | 705/26 |
| 7,672,970 | B2 * | 3/2010 | Skillen et al. | 707/999.102 |
| 2001/0032170 | A1 * | 10/2001 | Sheth | 705/37 |

FOREIGN PATENT DOCUMENTS

WO     WO0135235 A1     5/2001

OTHER PUBLICATIONS

"Classifieds2000 Launches Online Auctions Service" PR NEWSWIRE Jun. 10, 1998.* www.ubidz.com, May 8, 1999 (full text) Waybackmachine.com [online—http://web.archive.org/web/*/http://bidz.com] retrieved on Aug. 4, 2003, 13 pages.

www.yahoo.com, Jul. 5, 1998 (full text) Waybackmachine.com (online—http://web.archive.org/web/*/http://www.yahoo.com) retrieved on May 13, 2005, pp. 1-11.

"InternetSpeech.com Hired Seasoned Vice President of Marketing and Sales; Ed Kennedy to Market New Service Allowing Audio Internet Access Via Any Phone," Business Editors/High Tech Writers, Business Wire, New York, Dec. 7, 1999, 2 pages.

"Motorola delivers voice-activation of the Barclaycard website," M2 Presswire, Coventry, Dec. 9, 1999, 2 pages.

* cited by examiner

Fig. 1 – Block Diagram
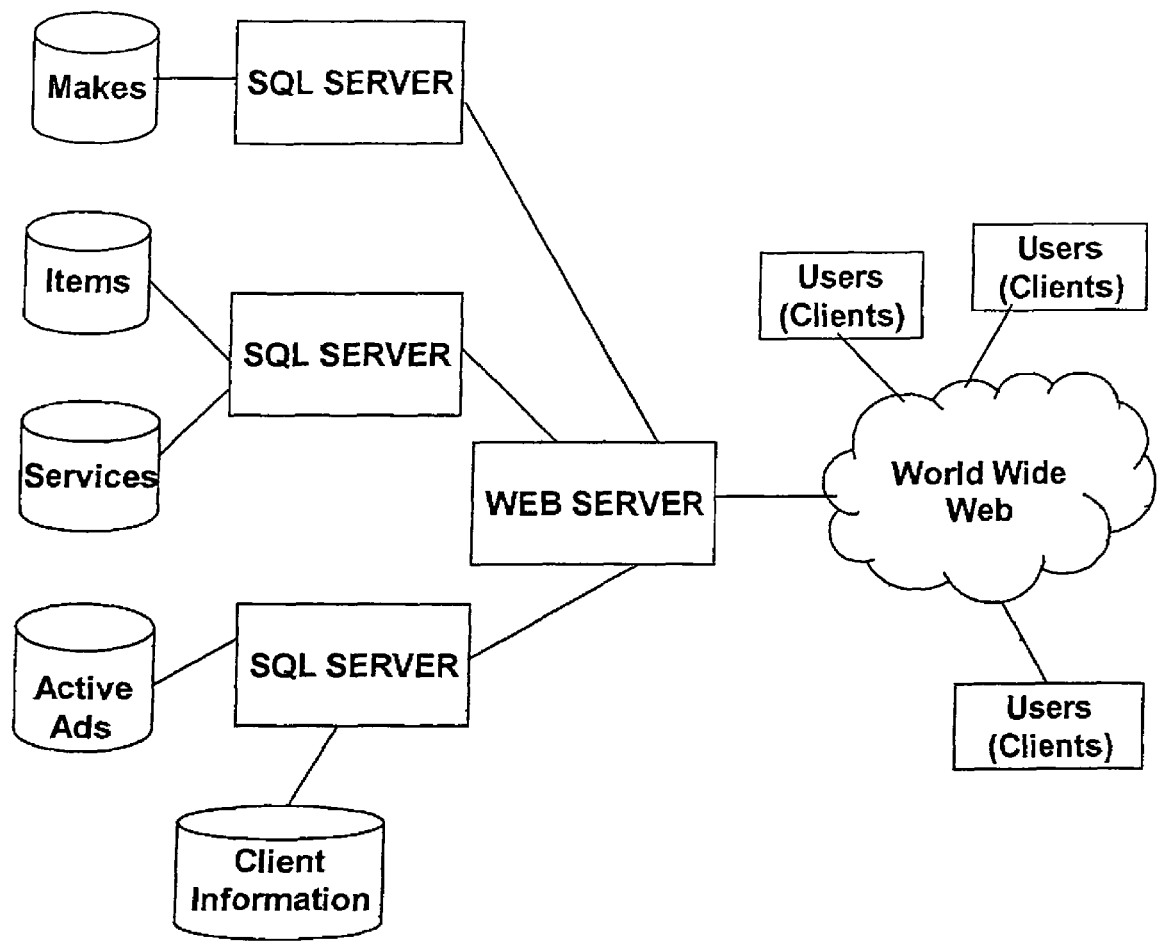

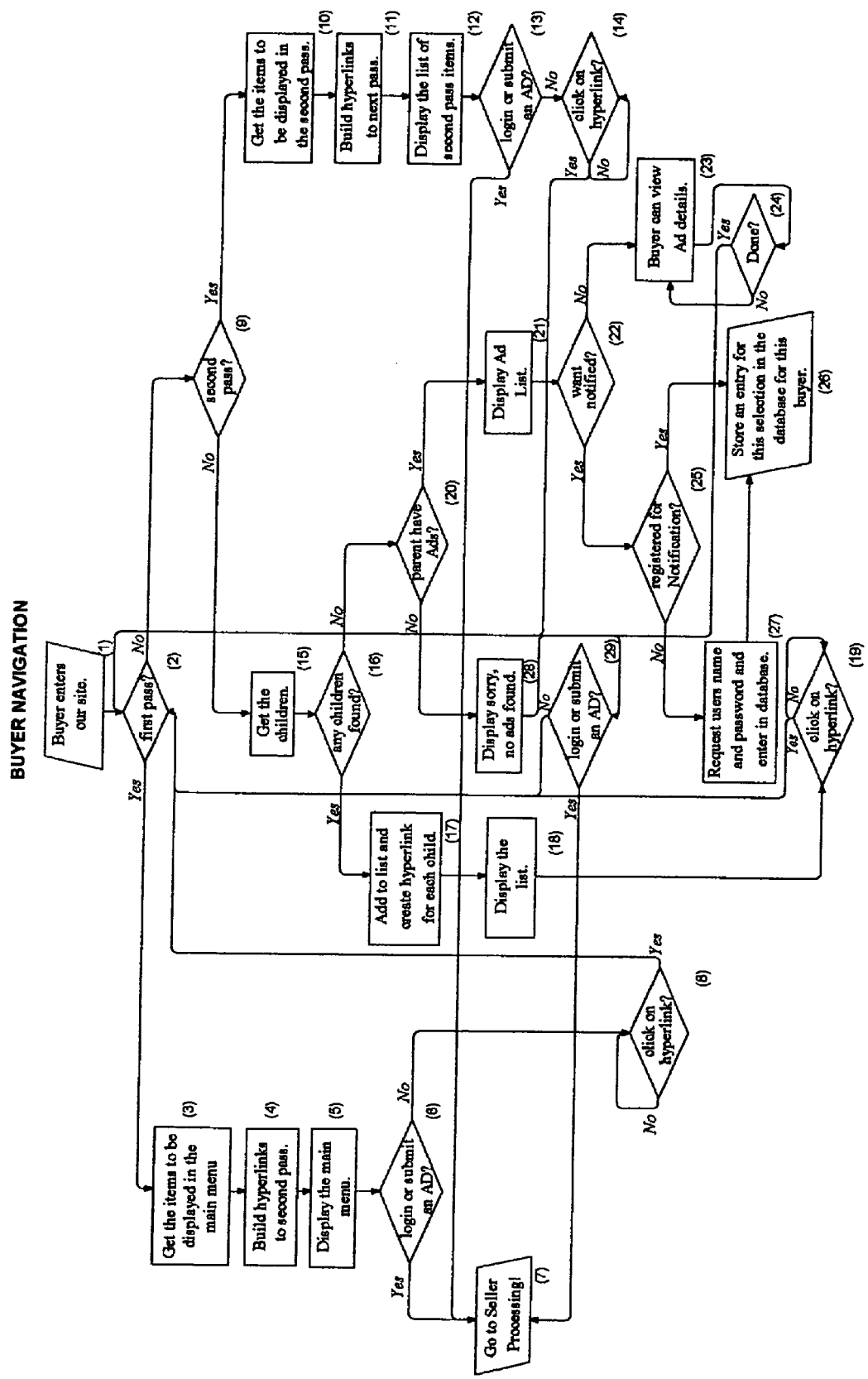
Fig. 2 Buyer Navigation Flow and Block Description:

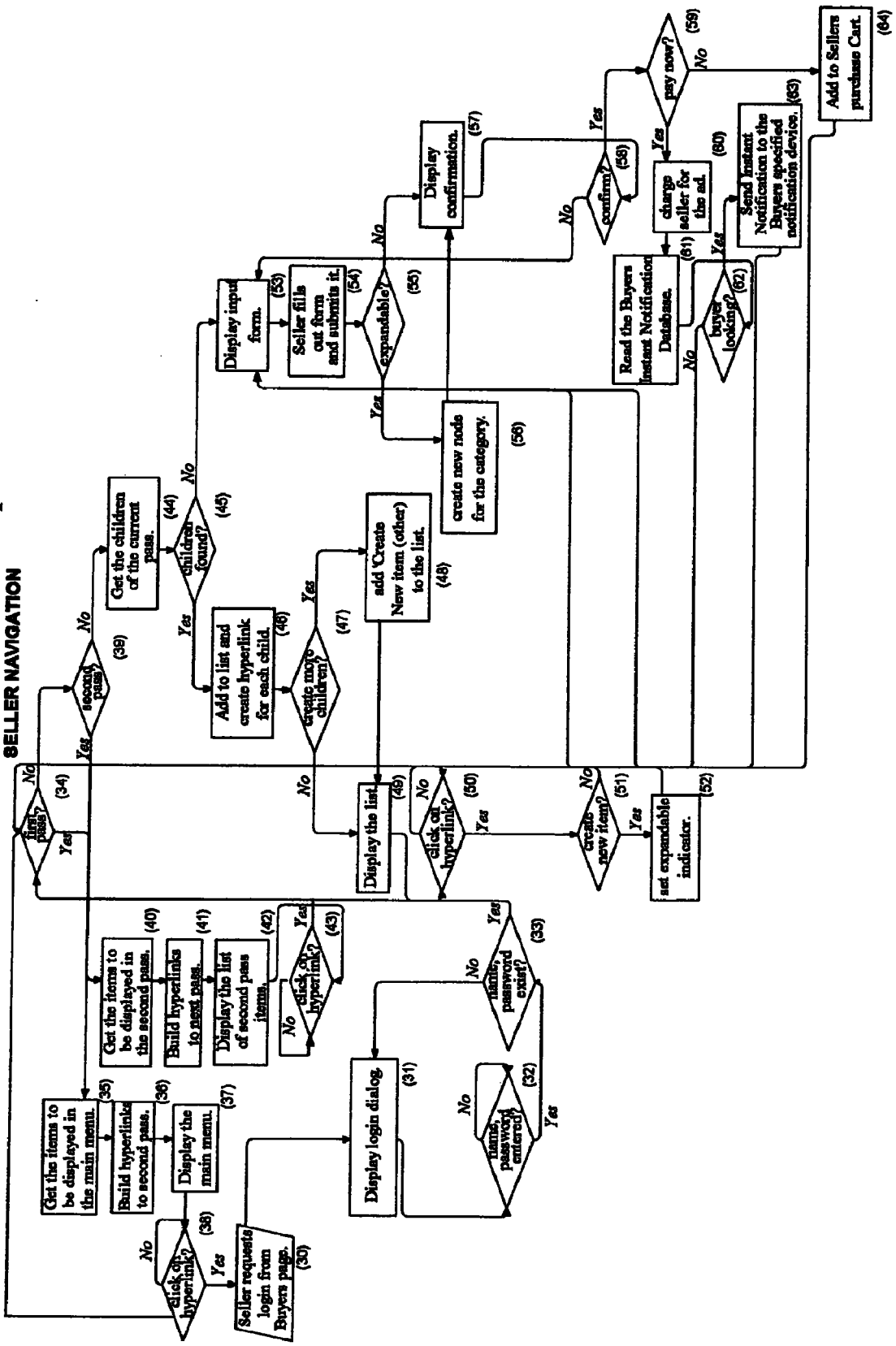
Fig. 3 Seller Navigation Flow and Block Description:
SELLER NAVIGATION

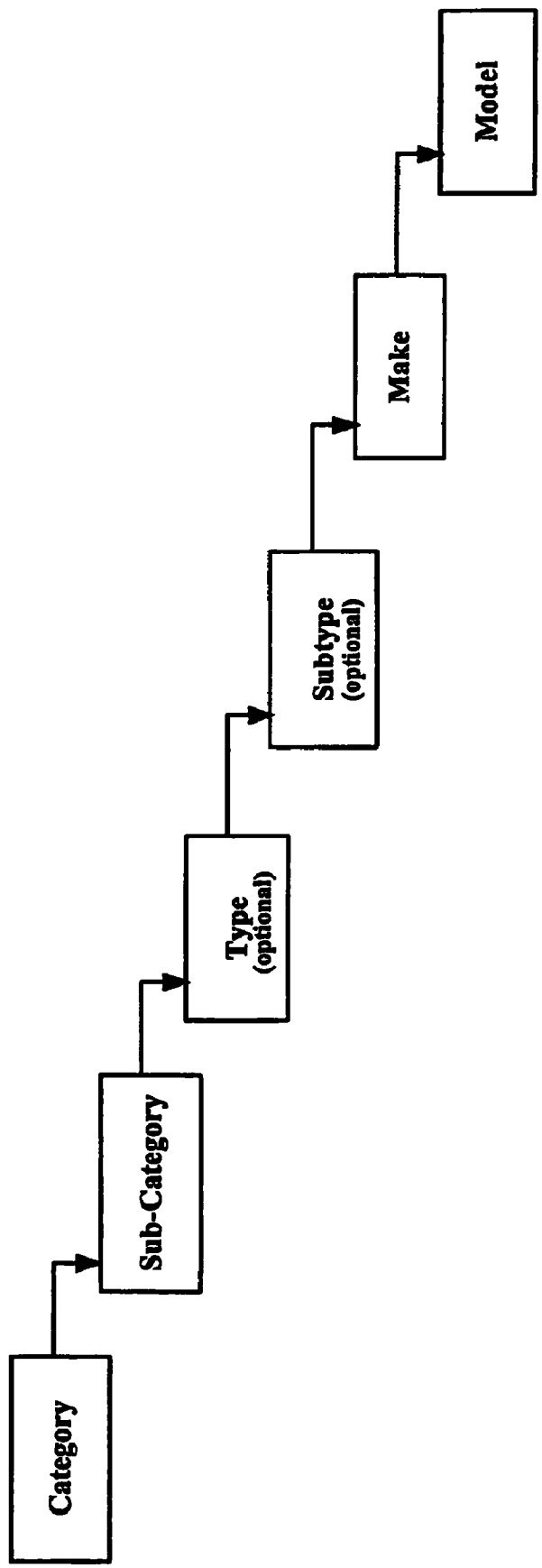
Figure 4. Taxonomy Structure

Fig. 5

Home     Submit an Ad

About Us...     Seller Login

Pick a Category:

Agricultural
Aircraft
Antiques
Automobiles
Boats
Heavy Equipment
Heavy Trucks
Industrial
Medical
Pickup Trucks
Recreational Vehicles
Sport Utility Vehicles and Vans

*Our Vision is International ~ Our Focus is Individual*

The most complete Global Internet Resource for buying and selling both used and new products and services.

Advertising Rates

Fig. 6

Home  Cancel/Edit Ad

About Us...  Buyer Page

AD Submission...
Pick a Category:

*Agricultural*
*Aircraft*
*Antiques*
*Automobiles*
*Boats*
*Heavy Equipment*
*Heavy Trucks*
*Industrial*
*Medical*
*Pickup Trucks*
*Real Estate*
*Recreational Vehicles*
*Sport Utility Vehicles and Vans*

*Our Vision is International ~ Our Focus is Individual*

The most complete Global Internet Resource for buying and selling both used and new products and services.

View My Purchase Cart   GO
Advertising       Update My Profile
Rates

Fig. 7

*Home*  *Submit an Ad*

*About Us...*  *Seller Login*

*Pick a selection for the Automobile Category:*

*Makes*
*Items*
*Services*
< Back

*Our Vision is International ~ Our Focus is Individual*

The most complete Global Internet Resource for buying and selling both used and new products and services.

*Advertising Rates*

Fig. 8

Home    Submit an Ad

About Us...    Seller Login

*Automobiles*

- *American Cars*
- *Antique Cars, American*
- *Antique Cars, British*
- *Antique Cars, European*
- *Antique Cars, Foreign*
- *Asian Cars*
- *British Cars*
- *European Cars*
- *Exotic Cars*
- *Hot Rods*
- *Kit Cars*
- *Limousines, American*
- *Limousines, European*
- *Muscle Cars, 1962-70*

< Back

*Our Vision is International − Our Focus is Individual*

The most complete Global Internet Resource for buying and selling both used and new products and services.

*Advertising Rates*

Fig. 9

*Automobiles :European Cars*

- *2-door*
- *4-door*
- *Convertible*
- *Diesel*
- *Station Wagon*

< Back

*Home*  *Submit an Ad*

*About Us...*  *Seller Login*

*Our Vision is International ~ Our Focus is Individual*

The most complete Global Internet Resource for buying and selling both used and new products and services.

*Advertising Rates*

Fig. 10

*Home*  *Submit an Ad*

*About Us...*  *Seller Login*

Automobiles :European Cars :Diesel

- *Audi*
- *BMW*
- *Mercedes*
- *Volkswagen*
- *Volvo*
- < Back

*Our Vision is International ~ Our Focus is Individual*

The most complete Global Internet Resource for buying and selling both used and new products and services.

*Advertising Rates*

Fig. 11

Home  Submit an Ad

About Us...  Seller Login

*Automobiles :European*
*Cars :Diesel :Mercedes*

- *190D*
- *190D Turbo*
- *300CD*
- *300D*
- *300SD*
- *300SDL*
- *300TD*
- *350D*

< Back

*Our Vision is International ~ Our Focus is Individual*

The most complete Global Internet Resource for buying and selling both used and new products and services.

*Advertising Rates*

Fig. 12

Home    Submit an Ad

About Us...    Seller Login

---

*Automobiles :European Cars :Diesel :Mercedes :300D*

 Click here to Sort Ads to your personal preference    | Instant Notification |

---

*Click on the Details Links to see Complete Advertisement(s).*

| 1987 | Mercedes/300D | 87000 Miles | No Photo | Blue | $6,000.00 | Details |
| 1986 | Mercedes/300D | 189000 Miles | No Photo | Yellow | $5,200.00 | Details |
| 1984 | Mercedes/300D | 345000 Miles | No Photo | Black/Tan | $2,500.00 | Details |
| 1989 | Mercedes/300D | 67000 Miles | No Photo | Blue/Tan | $16,000.00 | Details |
| 1982 | Mercedes/300D | 0 Miles | No Photo | Red | $2,000.00 | Details |
| 1984 | Mercedes/300D | 3000000 Miles | No Photo | yellow | $3,500.00 | Details |
| 1979 | Mercedes/300D | 475000 Miles | No Photo | red | $2,000.00 | Details |
| 1989 | Mercedes/300D | 64000 Miles | No Photo | Tan/Blue | $22,000.00 | Details |
| 1962 | Mercedes/300D | 900000 Miles | No Photo | blue | $10,000.00 | Details |

Fig. 13

Home　　　Submit an Ad

About Us...　　Seller Login

---

○ View most recent ads
○ In order of Lowest Price
○ Oldest to Newest by Model Year
○ Newest to Oldest by Model Year
○ Least to Most by Mileage or Hours
○ Most to Least by Mileage or Hours

[Sort Ads per selection below]

○ Sort by up to 3 choices of Zip Codes　　Zip1: [ ]　Zip2: [ ]　Zip3: [ ]

○ Sort by up to 3 choices of Area Codes　AreaCode1: [ ]　AreaCode2: [ ]　AreaCode3: [ ]

○ Sort ads by State or Province　　[-Select a State- ▼]

○ Sort ads by Country　　[-Select a Country- ▼]

[Sort Ads per selection above]

Fig. 14

Home    Submit an Ad

About Us...    Seller Login

---

*Our Vision Is International - Our Focus Is Individual*

Instant Notification Account Setup

Now we need some basic contact Information. Not all information is required.
* All required Information will have a blue asteric next to it. *

First Name: * [_____] [_____] (Middle Initial Optional)

Last Name: * [_____]

Street Address * [_____]

(If you cannot find your country or province or you need more address space please enter it on the line below.)

[_____]

City: * [_____]

(Type in the first letter of your state or country in the boxes below to find these faster in the list box.)

State or Province: * [_____]

Zip or Postal Code: * [_____]

Country: * [_____]

Country  Area  Phone
        Code    Code  Number

Phone: [____] [____] [_____]

Fax: [____] [____] [_____]

Cell Phone: [____] [____] [_____]

Pager: [____] [____] [_____]

[ PROCESS INFORMATION ]

Fig. 15

*Home*   *Submit an Ad*

*About Us...*   *Seller Login*

---

*Our Vision is International ~ Our Focus is Individual*

Instant Notification Criteria

To be notified immediately of all adds placed for this area leave fields blank. All Selections below are provided to enhance the instant notification of an add. You will have the option through your account to edit these settins any time.

(This is the text you will be sent to identify this instant notification.)

Notification Text: [Baffle Cleaning]

(You may enter a custom message to be sent to identify this instant notification.)

Custom Notificaiton Text: [Baffle Cleaning] (4 to 20 characters)

Year Range: [ ] to [ ] (4 digit year)

Maximum price willing to pay: [ ] (In US Dollars. EXAMPLE: 1,000)

(You may enter one word to search for in the add to limit the search to. EXAMPLE "red" for a Corvette))

Search Text [ ] (3 to 15 characters one word)

Do not select anything below if you wish to search worldwide

Zip or Postal Code: [ ] [ ] [ ] Enter up to 3

Area or Country Codes: [ ] [ ] [ ] Enter up to 3

State or Province [ ▾]

Country: [ ▾]

[ PROCESS NOTIFICATION ] [ EDIT ACCOUNT INFO ]

Fig. 16

Home     Cancel/Edit Ad

About Us...     Buyer Page (✻ indicates required field)     Our Vision Is International ~ Our Focus Is Individual

*Automobiles :European Cars :Diesel :Mercedes :300D*

Year: ✻     Price: ✻     (Optional) Mileage:     (Optional) Hours:

(Optional) Serial/VIN:     (Optional) Color:     Photo to Upload?:

Description: ✻

Location of Goods

Area Code: [352]

Zip Code: ✻ [34788]

City: ✻ [Leesburg]     State: ✻ [Florida]     Country: ✻ [United States]

[OK] [Cancel]

Fig. 17

Home    Submit an Ad

About Us...    Seller Login

Pick a Category:

Agricultural
Aircraft
Antiques
Automobiles
Boats
Heavy Equipment
Heavy Trucks
Industrial
Medical
Pickup Trucks
Recreational Vehicles
Sport Utility Vehicles and Vans

*Our Vision is International – Our Focus is Individual*

The most complete Global Internet Resource for buying and selling both used and new products and services.

*Advertising Rates*

Fig. 18

Home    Submit an Ad

About Us...    Seller Login

*Pick a selection for the Agricultural Category:*

*Our Vision is International ~ Our Focus is Individual*

*Makes*
*Items*
*Services*
*< Back*

The most complete Global Internet Resource for buying and selling both used and new products and services.

*Advertising Rates*

Fig. 19

Home       Submit an Ad

About Us...       Seller Login

*Agricultural*

- *Auctions*
- *Breeding*
- *Clubs*
- *Co-ops*
- *Consultants*
- *Employment: Help wanted*
- *Employment: Position wanted*
- *Engine Rebuilding, Diesel*
- *Engine Rebuilding, Gas*
- *Fairs*
- *Hydraulic Pump Rebuilding*
- *Oil Analysis*
- *Partnerships*
- *Shipping, Interstate*
- *Shipping, Intrastate*
- *Shipping, Overseas*
- *Transmission Rebuilding*
- *Trucking, Interstate, needed*
- *Trucking, Intrastate, needed*

< Back

*Our Vision Is International ~ Our Focus is individual*

The most complete Global Internet Resource for buying and selling both used and new products and services.

*Advertising Rates*

Fig. 20

Home    Submit an Ad

About Us...    Seller Login

Agricultural :Trucking, Interstate, needed

Our Vision is International ~ Our Focus is Individual

- Low Boy
- Pickup Truck and Flatbed Trailer
- Pickup Truck and Livestock Trailer
- Semi Tractor to haul Trailer
- Semi Truck, Livestock
- Semi, refrigerated
- Straight Truck, Livestock < Back The most complete Global Internet Resource for buying and selling both used and new products and services.

Advertising Rates

Fig. 21

Home          Submit an Ad

About Us...       Seller Login

*Our Vision is International – Our Focus is Individual*

Agricultural :Trucking, Interstate, needed :Semi, refrigerated

- from Alabama
- from Alaska
- from Arizona
- from Arkansas
- from California
- from Colorado
- from Connecticut
- from Delaware
- from Florida
- from Georgia
- from Hawaii
- from Idaho
- from Illinois
- from Indiana
- from Iowa
- from Kansas
- from Kentucky
- from Louisiana
- from Maine
- from Maryland
- from Massachusetts
- from Michigan
- from Minnesota
- from Mississippi
- from Missouri
- from Montana
- from Nebraska
- from Nevada
- from New Hampshire
- from New Jersey
- from New Mexico
- from New York
- from North Carolina
- from North Dakota
- from Ohio
- from Oklahoma
- from Oregon
- from Pennsylvania
- from Rhode Island
- from South Carolina
- from South Dakota
- from Tennessee
- from Texas
- from Utah
- from Vermont
- from Virginia
- from Washington
- from Washington D.C.
- from West Virginia
- from Wisconsin
- from Wyoming < Back The most complete Global Internet Resource for buying and selling both used and new products and services Advertising Rates

Fig. 22

Home        Submit an Ad

About Us...        Seller Login

*Our Vision is International ~ Our Focus is Individual*

*Agricultural: Trucking, Interstate, needed: Semi, refrigerated: from Michigan*

- *to Alabama*
- *to Alaska*
- *to Arizona*
- *to Arkansas*
- *to California*
- *to Colorado*
- *to Connecticut*
- *to Delaware*
- *to Florida*
- *to Georgia*
- *to Hawaii*
- *to Idaho*
- *to Illinois*
- *to Indiana*
- *to Iowa*
- *to Kansas*
- *to Kentucky*
- *to Louisiana*
- *to Maine*
- *to Maryland*
- *to Massachusetts*
- *to Michigan*
- *to Minnesota*
- *to Mississippi*
- *to Missouri*
- *to Montana*
- *to Nebraska*
- *to Nevada*
- *to New Hampshire*
- *to New Jersey*
- *to New Mexico*
- *to New York*
- *to North Carolina*
- *to North Dakota*
- *to Ohio*
- *to Oklahoma*
- *to Oregon*
- *to Pennsylvania*
- *to Rhode Island*
- *to South Carolina*
- *to South Dakota*
- *to Tennessee*
- *to Texas*
- *to Utah*
- *to Vermont*
- *to Virginia*
- *to Washington*
- *to Washington D.C.*
- *to West Virginia*
- *to Wisconsin*
- *to Wyoming*

< Back

The most complete Global Internet Resource for buying and selling both used and new products and services Advertising Rates Home　　　Submit an Ad About Us...　　　Seller Login

*Agricultural :Trucking, Interstate, needed :Semi, refrigerated :from Michigan :to Florida*

Click here to Sort Ads to your personal preference　　　| Instant Notification |

Click on the Details Links to see Complete Advertisement(s).

| Need Trucking to Orlando Florida | No Photo | $0.00 Hourly | Details |

Fig. 24

Home        Submit an Ad

About Us...        Seller Login

*Agricultural :Trucking, Interstate, needed :Semi, refrigerated :from Michigan :to Florida*

| Service Rate: $0.00 / Hourly | | | |
|---|---|---|---|
| Location of Services | | | |
| Area Code: 407 | Zip Code: 32707 | City: | State/Country: FL/US |
| Description: Need Trucking to Orlando Florida for a load of peaches to be picked up in the next week. | | | |

Contact: *Ron*

Telephone: (407) Not Listed

[Back to Ad List]

Fig. 25

Home        Submit an Ad

About Us...    Seller Login

---

◉ View most recent ads

○ In order of Lowest Price

Sort Ads per selection below

○ Sort by up to 3 choice of Zip Codes              Zip1: ▢     Zip2: ▢     Zip3: ▢

○ Sort by up to 3 choices of Area Codes        AreaCode1: ▢   AreaCode2: ▢   AreaCode3: ▢

○ Sort ads by State or Province        [–Select a State–▼]

○ Sort ads by Country                  [–Select a Country–        ▼]

Sort Ads per selection above

Fig. 27

Home     Cancel/Edit Ad

About Us...     Buyer Page

AD Submission...
Boats

- Boats, 6-13 feet
- Commercial
- Mechanics Specials
- Powerboats, 14-25 feet, Outboard
- Powerboats, 14-25 feet, Sterndrive
- Powerboats, 14-25 feet, Straight Inboard
- Powerboats, 26-35 feet, Diesel
- Powerboats, 26-35 feet, Gas
- Powerboats, 36-42 feet, Diesel
- Powerboats, 36-42 feet, Gas
- Powerboats, 43-53 feet
- Powerboats, 54-70 feet
- Powerboats, 71-100 feet
- Powerboats, 101-150 feet
- Sailboat, 21-31 feet
- Sailboats, 13-20 feet
- Sailboats, 21-31 feet
- Sailboats, 32-39 feet
- Sailboats, 40-49 feet
- Sailboats, 50-55 feet
- Sailboats, 56-75 feet
- Sailboats, 76+ feet < Back

*Our Vision is International ~ Our Focus is individual*

The most complete Global Internet Resource for buying and selling both used and new products and services.

View My Purchase Cart   GO
Advertising Rates     Update My Profile

Fig. 28

Home            Cancel/Edit Ad

About Us...        Buyer Page

AD Submission...                  *Our Vision is International ~ Our Focus is individual*

*Boats :Powerboats, 43-53 feet*

- *Convertible*
- *Houseboats*
- *Motor Yacht*
- *Motor Yacht, Aft Cockpit*
- *Offshore Performance, Express, Sundeck*
- *Offshore Racing*
- *Sportfish*
- *Trawler*

< Back

The most complete Global Internet Resource for buying and selling both used and new products and services.

View My Purchase Cart  GO
   *Advertising Rates*    Update My Profile

Fig. 29

Home      Cancel/Edit Ad

About Us...      Buyer Page

*Our Vision is International ~ Our Focus is individual*

AD Submission...

Boats :Powerboats, 43-53 feet :Motor Yacht

- *Bertram*
- *Chris Craft*
- *Egg Harbor*
- *Hatteras*
- *Luhrs*
- *Ocean*
- *Pacemaker*
- *Post*
- *Uniflite*
- *Viking*
- *---CREATE OTHER---*
- <u>Back</u>

The most complete Global Internet Resource for buying and selling both used and new products and services.

View My Purchase Cart   GO
  *Advertising*      Update My Profile
  *Rates*

Fig. 30

Home     Cancel/Edit Ad

About Us...     Buyer Page

---

(* indicates required field)     Our Vision is International ~ Our Focus is Individual Boats :Powerboats, 43-53 feet :Motor Yacht Make: * [　　　　　　　]     Model: * [　　　　　　　]

Year: * [　　]    Price: * [　　　　]    (Optional) Mileage: [　　　]    (Optional) Hours: [　　]

(Optional) Serial/VIN: [　　　　　]    (Optional) Color: [　　　]    Photo to Upload?: ☐

Description: *

[　　　　　　　　　　　　　　　　　　　　　　　　　　]

Location of Goods

Area Code: [407]    Zip Code: * [32707]

City: * [　　　]    State: * [Florida ▼]    Country: * [United States ▼]

[ OK ] [ Cancel ]

RECURSIVE METHOD AND SYSTEM FOR ACCESSING CLASSIFICATION INFORMATION

This is a Divisional of application Ser. No. 09/755,442 filed Jan. 5, 2001 now U.S. Pat. No. 7,389,252 now allowed, which claims the benefit of priority to U.S. Provisional Application Ser. No. 60/174,785 filed Jan. 6, 2000.

FIELD OF INVENTION

This invention relates to online classification of goods and services and in particular to methods and systems of using an advertising service that concentrates on customer needs in both perishable and non perishable goods and services worldwide. The methods and systems mimic human intelligence for the intuitive orderly classification of those goods and services that are to be retrieved by others.

BACKGROUND AND PRIOR ART

Advertisements for products and services has been used effectively in the print media over many years and with the advent of the worldwide web, businesses and individuals have a worldwide forum to advertise any of their products and services. However, using the web has added additional problems for buyer and seller users. For example, it is a common problem for users to waste valuable hours fumbling their way through various confusing web pages with distracting graphics while trying to locate specific advertised products and services. Often people have enlisted the use of complicated search engines that query other databases to aid in their searches. As sellers, the users endure classified advertising web sites that require excessive typing during the ad placements. As buyers, the users have great difficulty both accessing the site and finding the desired goods and services. The result is that clumsy forms and the lack of logical page progression stifle web users from reaching their end results.

Current web site designers are still receiving and presenting data as if they are publishing a standard classified magazine. When dealing with this data from a customers point of view, it involves a complicated non intuitive method of search for data retrieval and placement.

Various businesses are known to list advertisements for goods and services. For example, Traderonline.com, Yahoo!-Classifieds, Websbestclassified.com, #1 Classified-Boconline.com, Aircraft Shopper Online(ASO)—aso.solid.com, Trade-A-Plane—tradeaplane.com, Autoweb.com, AAAClassifieds.com, TheAdNet.com, ep.com and cars.com, are some of the more well known web businesses. However, as described below, these web sites have many problems.

Traderonline.com takes a long time to download because of their use of graphics. During a car search, when you click on makes, it gives you a list of makes, then models to choose from. After you've selected a make and model, it lists all makes of cars, not just the one you originally selected. When placing an ad, one must go through many pages of forms. Yahoo!-Classifieds mixes different types of vehicles together. Planes are mixed in with boats, and motorcycles are mixed with cars, and the site is complicated when used by sellers to submit an ad.

Websbestclassified.com is a messy and confusing site that is no better than those previously described. The site called #1 Classified-Boconline.com lists ads by state and doesn't have a column for prices. Products are mixed together. For example, boats are not broken down into various types and are mixed together. Aircraft Shopper Online(ASO)—aso.solid-.com is a complicated and confusing site with crowded homepage, and uses a map of the United States and the rest of the world to locate positions and is not easy to navigate.

Trade-A-Plane—tradeaplane.com charges to view the adds and uses small hard to read print, and lists a large crowded selection list on their homepage, and requires multiple click throughs to access information. Autoweb.com requires the user to repeatedly enter information on various web pages, and uses hard to read small print. AAA Classifieds—AAAClassifieds.com requires searching by alphabetical identifiers and requires the user to read through wordy explanations.

TheAdNet.com requires users to fill out search forms to view ads and requires input of pricing information. Ep.com does not break down categories to be specific enough and is hard to view the small print. Cars.com requires the user to enter multiple data items, requires several clicks on each web page, and is also hard to read because of the use of small print. This site does not subcategorize the main categories.

Various types of patents have been proposed over the years. See for example. U.S. Pat. Nos. 4,992,940 to Dworkin: 5,283,731 to Lalonde et al.: 5,706,434 to Kremen et al.: 5,724,521 to Dedrick: 5,745,882 to Bixler et al.; 5,774,873 to Berent et al.; 5,897,639 to Greef et al.; and 5,909,670 to Trader et al. However, none of these patents resolves the problems identified above.

SUMMARY OF THE INVENTION

The primary objective of the subject invention is to provide an online web based classification system that allows users, referred to as buyers and sellers, to logically click through a series of descriptive text menus to locate or advertise products, items and or services having specific characteristics.

The secondary objective of the subject invention is to provide an online web based classification system that allows buyers and sellers to logically click through a series of descriptive text menus to advertise or request makes, items and services having specific characteristics associated with their choice of a specific category.

The third objective of the subject invention is to provide an online web based classification system that is user friendly by reducing the chances for error by not requiring the user to provide text input for the navigation of the site. This reduces the number of click throughs needed on our system to locate the proper make, item or service.

The fourth objective of the subject invention is to provide an online web based classification system that eliminates the need for separate user dependent search queries such as Boolean searches. Thus, eliminating non-uniform search results that occur with search queries.

The fifth objective of the subject invention is to provide an online classification system that allows prospective sellers an error free method to place an ad using the exact same process that a buyer uses to find the specific ad placed.

The sixth objective of the subject invention is to provide an online classification system that has the capability of expanding and reducing the number of categories, sub-categories, types, sub-types, makes, models, and the like, via user interaction. For example, where the user being a seller of goods and services is allowed to expand at least one of a category, sub-category, type, sub-type, make or model.

The seventh objective of the subject invention is to provide an online classification system that allows prospective buyers to be instantly notified upon placement of new advertisements applicable to their requested goods and/or services, based upon criteria such as the maximum price willing to pay, location of goods or services, description information, and other contact information the buyer allows to be public. Requested goods or services can also be referred to as a wanted list or bid list.

The eighth objective of the subject invention is to provide a seller with a method of viewing the wanted or bid list requests that where placed within the instant notification database. This allows the seller to immediately contact a prospective buyer of a properly categorized make, item or service prior to the placement of an ad.

The ninth objective of the subject invention is to allow users once they reach the end of series of descriptive text menus, to filter and son the categorized information when viewing the list of ads at the end of make, item, or service selection. If the given subject returns more than the desired amount of data then the user has the option to sort by cost, location, year and date the ad was placed. There are options to limit the selections by a single keyword, zip code, country, province, and phone area code.

The tenth objective is to educate the layperson buyer and/or seller with respect to the product and service classifications used by professionals.

The eleventh objective of the subject invention is to provide the user with a site that leads the user to the requested information instead of a user having to use search queries to access information on the site.

The twelfth objective of the subject invention is to provide an online classification system that can be used with various data such as but not limited to goods, services, course listings, genetic mapping, any information having an orderly classification of objects and the like.

The invention is a software program that allows multiple categories of unlike objects or information to be located by users. The user logically clicks through a series of descriptive text menus to locate or advertise products, items and services having explicit characteristics. The process enabled by the software program, known as a "fluidity of taxonomy", accomplishes this by leading the user through a series of intuitive prompts.

The invention employs a computer, which is linked to a structured database and a server. This database is accessible through conventional computers, laptops, cellular phones and Personal Digital Assistant devices (P.D.A.) that have Internet access. The database can be located in the memory of the central computer, or distributed throughout a network via mirrored and load balanced server arrays.

In using the invention, there is a buyer side and a seller side. In the first step, as a buyer the user is given multiple descriptive categories to choose from. The user directs the system to the exact category desired by selecting an appropriate category from the main menu using a mouse or user enabled voice recognition. In the second step the system prompts the user to choose between three choices: "makes," "items" or "service" directly related to the previous category selected. If the user chooses "makes," the system displays another menu listing the valid types. At this point, if there is no more declassification stored in the database for the type selected, any ads of this type are displayed in a list. Otherwise, prompted by the users previous choice, the user is then shown another menu listing the valid subtypes. In this series of examples, the classification continues for two more levels, known as "make" and "model". Up to this point the user has provided no text input, but has simply traversed to the desired point by using a series of menu prompts.

At this point, the user has two ad viewing options. The first option is by scrolling down the ad list, for example 100 ads at a time and the second option is displaying the list filtered and sorted by pre-specified criteria. At the lowest level of "click down." the user has eliminated all irrelevant ads, and is presented with ads that meet the most specific classification of their choice. If the buyer is unable to locate the desired item or service, the user has the option to select the instant notification feature, described in a subsequent section.

If the user chooses to scroll down the ad/in format ion list, they also have the ability to son the displayed information, 100 entries at a time. For example, in the case of automobiles, the list could be sorted by year, make, model, price, color, miles, hours of use or details. New ads placed within for example the last 8 hours are identified by a unique color. If the user is interested in a particular ad, the user can click on a line item to view details of the ad information. This allows for efficient browsing of information by saving download time which lends itself to access by wireless and P.D.A. devices.

If the user chooses the second option, the filtered search option, by clicking on a button located on the buyers side ad view level or lowest click down level, a form is displayed that gives the user the option to select from a set of predefined son algorithms with options. The filtering options can include up to three area codes, up to three zip codes, up to three states, one country, or one province. The ads can be sorted by the age of the ads, relating to make and model (oldest to newest or newest to oldest), maximum price willing to pay, mileage or hours and color preference. Upon submission of the form, the program will then display the results of the users requests for that specific criteria. The final ad results are displayed, up to 100 at a time by the criteria the user picked at the lowest level of click down or by a pre arranged default thereby eliminating human error.

Further objects and advantages of this invention will be apparent from the following detailed description of a presently preferred embodiment which is illustrated schematically in the accompanying drawings.

BRIEF DESCRIPTION OF THE FIGURES

FIG. 1 shows a system block diagram of the invention.

FIG. 2 is a flowchart of a buyer navigating through the novel invention website.

FIG. 3 is a flowchart of a seller navigating through the novel invention website.

FIG. 4 shows a basic taxonomy structure of accessing classification information using menu pages of category, subcategory, types, subtype, makes, and model.

FIG. 5 shows a Buyer main menu page embodiment of the invention with main category headings.

FIG. 6 shows a Seller main menu page embodiment of the invention with main category headings.

FIG. 7 shows a second menu page having first subcategory headings of the embodiment of FIG. 5 for picking the automobile category.

FIG. 8 shows a third menu page having type headings based on FIG. 5.

FIG. 9 shows a fourth menu page having subtype headings based on FIG. 5.

FIG. 10 shows a fifth menu page having make headings based on FIG. 5.

FIG. 11 shows a sixth menu page having model headings based on FIG. 5.

FIG. 12 shows a seventh page of the final ad list based on FIG. 5.

FIG. 13 shows an eighth page of how user can sort the ad list of FIG. 12.

FIGS. 14 and 15 show menu page embodiments of using the instant notification feature of the invention.

FIG. 16 shows an ad form page a seller completes after passing through a similar series of pages as those shown by FIGS. 6 through 11.

FIG. 17 shows a Buyer main menu page embodiment of the invention with main category headings for picking the agricultural category.

FIG. 18 shows a second menu page having first subcategory headings of the embodiment of FIG. 17.

FIG. 19 shows a third menu page having type headings based on FIG. 17.

FIG. 20 shows a fourth menu page having subtype headings based on FIG. 17.

FIG. 21 shows a fifth menu page having origination(from) headings based on FIG. 17.

FIG. 22 shows a sixth menu page having destination(to) headings based on FIG. 17.

FIG. 24 shows a detail description of ad of FIG. 23.

FIG. 25 shows an eighth page of how user can son the ad list of FIG. 24, similar FIG. 13.

FIG. 27 shows a third menu page having type headings based on selecting Makes in FIG. 26.

FIG. 28 shows a fourth menu page having subtype headings based on selecting Powerboats, 43-53 feet in FIG. 26.

FIG. 29 shows a fifth menu page having make headings based on selecting Motor Yacht in FIG. 28.

FIG. 30 shows a sixth page form based on selecting CREATE OTHER in FIG. 29 for having a Seller submit an Ad that does not have a make heading in FIG. 29.

DESCRIPTION OF THE PREFERRED EMBODIMENT

Figure 23:
FIG. 23 shows a seventh page of the final ad list based on FIG. 17.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The invention can be implemented in a distributed network architecture of servers, connected to the worldwide web. The software structure of the invention allows the system flexibility to distribute the computer processing and databases to multiple servers in order to facilitate speed and reliability of the site. This design also takes advantage of web caching, data replication, to different geographic regions, in order to avoid Internet communication bottlenecks. A system block diagram using the invention is shown in FIG. 1, wherein computer users using wired or wireless communications can access the software program via the world wide web. The information that describes the classification of the makes, items, and services, the active ads, the active notification requests and client information, is stored in the data stores shown on the left. The SQL (Structured Query Language) servers main function is to retrieve the information from the data stores. The Web server(s) then use the information retrieved via the SQL servers to create and send the web pages to the users via the worldwide web.

The invention will now be described in reference to the following categories:
I Database Design
II Navigation
III Client Administration
IV Instant Notification
V Customized Ad Presentation
VI Banner Ad Placement
VII Detailed Description of Embodiments

I Database Design

The database design of the invention is divided into two major components. The first component is a spreadsheet-like formatted table. This database is used as the main data source for program logic that transforms the database into the second component, a node-based structure that leads to the generation of a series of web server pages. Theoretically, the spreadsheet table can have an infinite number of rows and columns, but for the purposes of this description, the table is described with eight rows and six columns.

While the descriptions used to describe the database architecture are specific to one application, the design is flexible enough to allow use in a broad range of environments. By simply changing the data content, an open-ended solution exists to categorize nearly any group of data into a logical path to a given end point. In our examples, the end point is an advertisement or a buyer notification that an advertisement was placed, but it could just as easily refer to a catalog ordering system or catalog order notification system, or many other systems that require the storage and retrieval of an organized set of data classification.

I(a) Spreadsheet Table Structure

The classification of different types of goods and services requires a process to handle unlike and non-sequential items, which are contained in the database. The algorithm used in the invention introduces the concept of a Control ID that identifies the sequence in which the unlike items should be displayed, and how they are treated through the various levels of the menu system. The Control ID is a binary number representing the possible combinations of goods and services that are described using Type. Sub-Type. Make and Model.

The Control ID is used to identify the next step of processing of the dynamically created menu lists as the user "drills down", or clicks through the menu system. The processing, described in sections that follow, involves program logic that allows the database content to be expanded both vertically (rows) or horizontally (columns) at various points, and to prompt the user with input forms once the end of the "drill-down" has been reached. An example of the spreadsheet database used to describes goods, is shown below in TABLE 1.

TABLE 1

| ITEM | TYPE | SUB-TYPE | MAKE | MODEL | CONTROL ID |
|------|------|----------|------|-------|------------|
| Item-1 | Type | | | | 1 |
| Item-2 | Type | Sub-Type | | | 2 |
| Item-3 | Type | | MAKE | | 3 |
| Item-4 | Type | | | MODEL | 4 |
| Item-5 | Type | | MAKE | MODEL | 5 |
| Item-6 | Type | Sub-Type | MAKE | | 6 |
| Item-7 | Type | Sub-Type | | MODEL | 7 |
| Item-8 | Type | Sub-Type | MAKE | MODEL | 8 |

Given the control ID, one can then determine exactly which fields contain data and which fields will be NULL. This allows a grouping to be built, and displayed in a consistent and controlled manner for unlike goods. Additionally, by the specific formatting of the data, the program logic can be selected when it is appropriate for rows to be added (new makes or models, for example) as well as new columns (further classification of items such as the introduction of models for a specific make).

Applying this principle, we discuss the process of generating menu-based web pages that lead the user through any combination of classifications and end up at a final destination for final processing. The Control ID allows the user to see the data represented as follows, where → is used to indicate user selection via mouse click, or other computer-pointing device(s) such as voice recognition.

ITEM-1→Type-1→Form processing for Item 1
ITEM-2→Type-2→Sub-Type-2→Form processing for Item 2
ITEM-3→Type-3→MAKE-3→Form processing for Item 3
ITEM-4→Type-4MODEL 4→Form processing for Item 4
ITEM-5→Type-5→MAKE-5→MODEL-5→Form processing for Item 5
ITEM-6→Type-6→Sub-Type-6→MAKE 6→Form processing for Item 6
ITEM-7-→Type-7→SubType-7→MODEL 7→Form processing for Item 7
ITEM-8→Type-8→Sub-Type→MAKE→MODEL→Form processing for Item 8

I(b) Node-based Structure

The node-based database in the invention is automatically generated from the spreadsheet table. Users providing further classification of the items in the database subsequently expand the node structure. The database is used to control the navigation process up, down and across the taxonomy of information.

The organization of nodes to form a path to the end point object can be described by a series of tiers, which logically structure the data. The first tier is the parent node that consists of the main classification of objects. Some examples of a first tier node might include 'Aircraft', 'Boats', 'Cars', etc. Each, of first tier nodes contains objects that can fall into distinct second tier categories.

The second tier nodes link the first tier to the third and all subsequent tiers by describing the categories of objects that are related to the first tier. Examples of a second tier node might include the categories of 'Makes', 'Items', and 'Services'. This node forms the "nodetype" identifier that determines which node table that should be accessed during navigation of the database.

The third and subsequent tiers sub classifies the parent object into farther descriptive elements. Examples include '4×4 Extended Cab', 'Gas', or 'Diesel' which might be used to describe a type of first tier 'Makes' node named 'Pickup Truck'.

Every node contains a unique node identifier, a node type identifier, and a reference to its parent node in addition to a node name identifier. All identifier fields are numerical indexed fields that allow for the fastest possible access to the data. The node path is the numerical accumulation of node identifiers that make up the combination of descriptive phrases that are selected by clicking on a series of 'Hyperlinks' to find the end point object.

The node path can be reverse traversed via each nodes parent identifier. The node identifier field of the final node in the path is the only data that is needed to be stored with each individual ad placed in the database.

By the same token, this node identifier is used when a Buyer whom is seeking to find a particular make, item, or service associated with any given category places a request for notification. The node identifier is a single point of reference that contains enough information to establish its point of origin and all elements in between.

The nodenames table contains a single point of reference to every unique categorical name used in the navigation of the database. For example, while the name 'Cessna' may appear in many node path combinations, its text is only stored in a single table entry in the database table and is referenced by its numerical identifier to make access to the data quick and efficient.

A single Advertisement table houses the details of the end point object. This table contains the information that is ultimately being searched. The use of the database with a web site that integrates the needs of Buyers and Sellers is described in reference to FIGS. 2 and 3.

II Node Navigation

The goods or information that is offered is located by navigating a series of 'hyperlinks' that take the end user to his/her desired selection in an orderly fashion. 'Hyperlinks' are simply words or groups of words that can be selected by mouse clicked, voice recognition or other pointing device inside a web browser. The 'hyperlinks' take the user to a more specific level of relevance associated with the word or groups of words.

FIG. 2 shows a navigation flow chart for the buyer. FIG. 3 shows a navigation flow chart for a seller. The core processing of both the buyer and seller navigation flow is a similar recursive process. The recursive process searches the database to determine the next list of "hyperlinks" to be built based on the previous series of menu selections. The following flow diagrams and block descriptions illustrate the core recursive process and processing that is specific to the buyer and seller navigation.

A buyer navigating through the website will now be described in reference to FIG. 2.

First pass leg of flow in FIG. 2:
(1) Buyer enters the site—
   In block 1, the buyer enters the site using a browser that views web documents, such as an Internet web browser or Internet capable cell phone etc.
(2) Is this the first pass?—
   Block 2 enters a recursive process that asks the question whether or not to create the main menu [categories] for buyer.
(3) (Yes to block 2) Get the items to be displayed in the main menu—
   Block 3 retrieves the main menu items [categories] from the database to build the main page.
(4) Build hyperlinks[1] to second pass—
   Block 4 creates all the hyperlinks for the main page. The main page is split into a header, body, and footer.
   HEADER: The header is a fixed section with no scroll bar and contains the logo for the corporate site as well as other site related hyperlinks [to seller page, to corporate information etc.].
   BODY: The body contains dynamic information, such as hyperlinks to the next group [menu] of information to be displayed. These links are considered the main/parent category objects.
(5) Display main menu—
   In block 5, the main page is displayed which contains the main/parent category hyperlinks in the body.
(6) Does Buyer want to login or submit an Ad?—
   Block 6 asks if the user clicked on the hyperlink that takes the buyer to the seller page.

(7) (Yes to block 6) Go to Seller Processing—
   Block 7 leaves buyer processing and goes to seller processing [Block 30 in FIG. 3]
(8) (No to block 6) Did the buyer click on a hyperlink?—
   Block 8 asks if the user clicked on any of the main/parent-category hyperlinks. If so, enter the recursive processing [Block 2].

Second Pass leg of flow in FIG. 2:
(9) (No to block 2) Is this the second pass?
   Block 9 asks the question whether or not to create the sub-category menu selections for the buyer.
(10) (Yes to block o) Get the items to be displayed in the second pass—
   Specifically the second pass consists of the makes, items, and services subcategories.
(11) Build the hyperlinks to the next pass—
   Block 11 creates the hyperlinks for the sub-category menu items. The hyperlinks contain information that results from the user's main menu selection.
(12) Display the list of second pass items
   Block 12 displays the sub-category menu in the body of the page.
(13) Does Buyer want to login or submit an Ad?—
   Block 6 asks if the user clicked on the hyperlink that takes the buyer to the seller page. If so, the buyer leaves buyer processing and enters seller processing [Block 7 and into FIG. 3].
(14) (No to block 13) Did buyer click on a hyperlink?
   Block 14 asks the question if the user clicked on a sub-category menu item. If so, enter the recursive processing [Block 2].

Next pass leg of flow in FIG. 2:
(15) (No to block 9) Get the children—
   Using the information gained from previous menu selections the database is interrogated to build a record set of children [next menu items] belonging to the previous menu selection [parent].
(16) Were there any children found?
   Does the database contain any children of the previous menu selection [parent]. If the database query resulted in children [menu items] found that belonged to the previous menu selection [parent] then the YES branch is taken, otherwise NO is taken.
(17) (Yes to block 16) Add to the list and create hyperlink for each child for each of the children found in the previous step a hyperlink is created with information about the child and the parent.
(18) Display the list—
   Block 18 presents the menu list based on the previous series of menu selections.
(19) Did buyer click on a hyperlink?
   Block 19 asks the question if the user clicked on a menu item. If so, enter the recursive processing [Block 2].

Ads leg of flow in FIG. 2:
(20) (No to block 16) Does the parent have Ads?
   Block 20 interrogates the Ad database to create a record set of Ads belonging to the last menu selection [parent] of a menu selection series.
(21) (Yes to block 20) Display Ad List
   Block 21 builds and provides the buyer with a list of Ads based on the user's series of menu selections
(22) Does Buyer want to be notified?
   Block 22 asks if the user clicked on the hyperlink requesting Instant notification [buyer to be notified] when a new Ad is placed in this list.
(23) (No to block 22) Buyer can view Ad details in block 23
   the buyer is viewing the Ads for the user's series of menu selections.
(24) Done Viewing?
   Block 24 asks if the buyer is done viewing the Ads. If not, the buyer continues to view Ads. If done, return to the recursive process starting at the main menu [Block 2]
(25) (Yes to block 22) Is Buyer registered for instant notification?
   In block 25, go to the database to determine if the user has registered to use the instant notification feature.
(26) (Yes to block 25) Store an entry for this selection in database for this Buyer—
   An entry in the database is created that indicates that this buyer is to be notified when an Ad is added to the current Ad list.
(27) (No to block 25) Request user's name and password and enter in database
   Present the user with a form to enter name and password. The buyer enters the information and goes to Block 26.
(28) (No to block 20) Display sorry-no Ads found in block 28
   the buyer is informed that there were no Ads found.
(29) Does Buyer want to login or submit an Ad?—
   Block 29 asks if the user clicked on the hyperlink that takes the buyer to the seller page. If so, the buyer leaves buyer processing and enters seller processing [Block 7 and into FIG. 3]. If not, enter the recursive process starting at the main menu [Block 2].
   FIG. 3 shows a navigation flow chart for a seller, and will now be described.

First pass leg of flow in FIG. 3:
(30) Seller requests login from Buyers page
   Entry point into Seller page processing
(31) Display login dialog
   Present the user with a dialog box to enter user name and password
(32) Seller's name and password entered?
   Waiting for user to enter login information
(33) (Yes to block 32) Does name and password exist in database?
   Interrogate database to determine if user's information matches the databases information for the user. If so, enter the recursive process starting at the main menu [Block 34]. Otherwise, present user with the dialog box to enter user name and password [Block 31].
(34) (Yes to block 33) Is this the first pass?
   Same as Block 2 in buyer processing of FIG. 2 [except for seller here].
(35) (Yes to block 34) Get the items to be displayed in the main menu—
   Same as Block 3 in buyer processing of FIG. 2 [except for seller here].
(36) Build hyperlinks to second pass—
   Same as Block 4 in buyer processing of FIG. 2 [except for seller here].
(37) Display main menu—
   Same as Block 5 in buyer processing of FIG. 2 [except for seller here].
(38) Did the seller click on a hyperlink?
   Same as Block 8 in buyer processing in FIG. 2 [except for seller]. If so, enter the recursive processing [Block 34].

Second Pass leg of flow in FIG. 3:
(39) (No to block 34) Is this the second pass?
   Same as Block 9 in buyer processing in FIG. 2 [except for seller here].

(40) (Yes to block 39) Get the items to be displayed in the second pass—
Same as Block 10 in buyer processing in FIG. 2 [except for seller here].
(41) Build the hyperlinks to the next pass—
Same as Block 11 in buyer processing in FIG. 2.
(42) Display the list of second pass items—
Same as Block 12 in buyer processing in FIG. 2.
(43) Did seller click on a hyperlink?
Same as Block 14 in buyer processing in FIG. 2. If so, enter the recursive processing [Block 34].

Next pass leg of flow in FIG. 3:
(44) (No of block 39) Get the children of the current pass—
Same as Block 15 in buyer processing in FIG. 2.
(45) Were there any children found?
Same as Block 16 in buyer processing in FIG. 2.
(46) (Yes to block 45) Add to the list and create hyperlink for each child—
Same as Block 17 in buyer processing in FIG. 2. Except for seller processing—
Set flag if any of the children indicate [based on Control id assigned] that the parent can create more children.
(47) Do we allow the parent to create more children?
Block 47 checks the flag to determine if the parent is allowed to create more children. If not, display me list [Block 49].
(48) (Yes to block 47) Adds 'Create New Item [other]' to the list—
Add a hyperlink to the existing list for the menu selection called 'Create Other'. Go Display the list [Block 49],
(49) Display the list—
Same as Block 18 in buyer processing.
(50) Did the seller click on a hyperlink?
Block 50 asks the question if the user clicked on a menu item.
(51) (Yes to block 50) Is this the link to create a new item?
Block 51 asks if the user selected the 'create other' menu item. If not, enter recursive processing [Block 34].
(52) (Yes to block 51) Set expandable indicator—
The expandable indicator [based on Control id assigned] tells the processor how to display the input form. It determines if some data is pre-filled with information from the database or whether or not the seller is allowed to supply new information that will be added to the database. This is the mechanism that the database gains intelligence from user interaction. Goes to Block 53.

Ad Input leg of flow in FIG. 3:
Display Input form—
Block 53 presents the seller with the Ad input form that is dynamically determined by the Control ids assigned to the previous 2 menu selections.
(54) Seller fills out form and submits it—
In block 54 the seller fills out the Ad input form presented and submits the form.
(55) Was expandable indicator set?
Block 55 asks if the seller selected the hyperlink ['create other'] to create a new menu item [due to previous menu selection]. If not, go to Block 57.
(56) (Yes for block 55) Create new node for the category—
Block 56 adds database records based on the information provided by the seller for the new menu item. The new menu item is flagged for Administrative approval. Go to Block 57.
(57) Display Confirmation
Block 57 asks the seller to confirm data entered in the Ad input form.
(58) Did Seller confirm Ad?
Asking if the seller confirmed Ad. If not, re-display input form [Block 53].
(59) (Yes to block 55) Does the seller want to pay now?
Block 59 asks the seller if completed entering Ads.
(60) (Yes to block 59) Charge Seller for the Ad(s)—
In block 60 the Ads are stored in the database.
(61) Read the Buyers Instant Notification database
Interrogate the database and create a record set of any buyers that need to be instantly notified of the addition of this Ad.
(62) Any buyers looking for this item?
Block 62 asks if any buyers need to be notified about this Ad. If not returns to the recursive process starting at the main menu [Block 34]
(63)
(Yes to block 62) Send instant notification to the buyers specified notification device.
Block 63 sends an electronic notification to the buyer. The buyer is notified through the buyer's electronic contact device (e-mail, cell-phone, pager etc.) indicated in the database. Return to the recursive process starting at the main menu [Block 34](No to block 59) Add to sellers purchase cart—
In block 64 go to the database and store the Ad in the database as a 'purchase cart Ad' for the seller. Return to the recursive process starting at the main menu [Block 34].

III Client Administration

Client tables house information associated with users who wish to sell goods, and buyers whom are looking to be notified when ads for specific goods are placed. Users have the option, while editing their account information, to specify what information can be displayed to the rest of the site users. By default, all information and contacts are processed through the contact software located on the server system, and at no time is email information shown. If a user wishes for personal information such as phone, address or fax to be shown to the general public, the user places the information in the ad at the time of submission. New contact devices can be added to the accounts by website personnel. There is no limit to the number of available contact methods stored for a user. The user has the option to choose the notification device or devices used to contact them.

The advantage of the client administration is the users ability to view and edit all ads, personal information, and instant notifications. In essence the user is able to view, edit and son all information concerning their personal interaction with the web site. The program enters default data regarding the user, if and when the user has already provided the information to the client database.

All information concerning client information, and site interaction will be stored via several tables linked by a unique client Id. The client id is used to get contact device information, personal information within ads, and personal information within the instant notification database.

IV Instant Notification

FIGS. 14 and 15 show menu page embodiments of using the instant notification feature of the invention. If a user clicks on the instant notification button at the ad view level or lowest "click down" level in FIG. 12, a form (FIGS. 14 and 15) comes up filled in automatically with what the user is wanting depending on which subcategory and subsequent type, subtype(s), and (make and model) if applicable therefore, the placement of the button to click on instant notification eliminates human error since the information is automatically filled in the instant notification (wanted) form. Instant Notification is a (wanted) request form with criteria that has not been found in the database or has not been placed by a user as of yet.

Up to this point, the user has not been required to use keyboard entry. They now have the option, if their account gives them access to the process, to add a request to be instantly notified. They still do not have to type anything to receive an instant notification. If they leave the form alone they receive all ads placed to the category of their choice. If they wish, they can limit the amount of notifications by choosing for example 3 zip codes, 3 phone area codes, mileage, maximum price willing to pay, country, province.

If a user does not have the appropriate access to this section they will be required to provide information for the setup of an account. See FIGS. 14 and 15. After the user enters the information required to identify how the user is to be notified, the user has the option to input up to for example three states, one country, one province, year range and maximum price willing to pay, mileage, hours and color preference. The user must then type in their area Code, e-mail address and pager criteria, if applicable, and choose their country code. For the users of cell phones, pager and e mail addresses, the program automatically sends the specific data to the user in the format the user specified in the advanced notification form immediately upon ad placement and only display the exact results of the users requests for that specific criteria the user chooses.

The user has the option in a specific box to personalize the Instant Notification criteria in their own alphanumeric terms that alert the users of Cell Phones. E-mail. Personal Digital Assistant (P.D.A.) devices, or pager of choice allowing certain devices that can not accept long strings of text over 25 characters.

Once the client has placed an instant notification they have the option to view and edit all of their instant notification requests from within the client console. After they have been notified of all ads placed meeting their criteria, a flag can be displayed next to all their instant notification requests containing ads that they have not yet viewed.

V Customized Ad Presentation

The user of the invention system can also customize their own view of the resulting data list through a sorted search. The user can focus on specific items of interest by sorting on a variety of factors in the dataset. If the user clicks on the sort ad button located on the buyers side ad view level or lowest "click down" level, a form can come up (similar to those of FIGS. 13 and 25 which are described in more detail later) with the results of the lowest level of "click down" criteria automatically filled in the filtered search request form, thereby eliminating human error. The user has the option to type in or utilize click down boxes with options of up to three area codes, up to three zip codes, up to three states, one country, or one province. The user can display the most recent ads first or last, or sort by maximum price willing to pay, mileage or hours or color preferences. Any combination or all of the sorted search criteria can be filled in by the user and the program displays the results of the users requests for that specific criteria at the end of the "Fluidity of Taxonomy" drill down the user chooses. At the lowest level of "click down" the user has eliminated all irrelevant choices at the ad display level. The final ad results can be displayed, up to 100 at a time, by the criteria the user has picked at the lowest level of click down eliminating human error.

VI Banner Ad Placement

Target banner placement can also be done because of the nodes table structure previously described. This allows a client to purchase adspace from any node all the way down the node structure to the ad display level. Example 1: A Caterpillar dealer wishes to secure all banner ads pertaining to Caterpillar tractors and all nodes beyond. When a user clicks on the Agricultural category, on makes, Tractors and then Caterpillar, all pages displayed thereafter in the node tree will contain their banner advertisement. Example 2: If the Caterpillar dealer only wishes to place an ad on one page then they have the option to do so.

As a basis for selling prices all nodes have counters to track the availability of impressions oh each given node. If a client asks for a node tree price all node counters in the requested tree may be added together to calculate the appropriate pricing. If a client requests a specific placement, the information for that node is readily available.

VII Detailed Description of the Embodiments

FIG. 4 shows a basic taxonomy structure of accessing classification information using menu pages of category, subcategory, types, subtype, makes, and model. The user can find a specific product, part, or service by using their mouse to click on selections in a series of menus that list everything organized by category, subcategory, type, subtype, make and model. This organization of primarily relying on menu pages allows the user to reach the list of desired information (such as the final ads) as efficiently as possible, without having to enter any user dependent search queries. Once a user has gotten to the end menus of makes and models for example, the site lists all relevant ads, displaying the year, make, model and price for every ad. To view the description of the ad the user clicks on a details heading next to the ad. No typing is necessary to view any of the ads, and the sequence of menus limits the list to the specific type the user is looking for.

The user who wants to submit an ad is led through the same series of menus so that their ad is classified according to the existing menu structure. If the advertiser would like to list their ad under a type or subtype classification that isn't present in the existing menus, they can contact the website via email, telephone, and the like, to have that type or subtype classification added to the menus. If the make or model isn't present in the menus, the user can add them interactively during the ad submission process. Thus, makes and models are data driven and become more comprehensive through user interaction. Types and subtypes can be controlled and updated by the website personnel to prevent unstructured and unmanageable growth of the menu's hierarchy.

The website invention avoids graphics that are common to most Internet sites, and which are also time-consuming to download. As the following figures of menu pages show, the only graphics are the company logo that only needs to be downloaded once, when the web sue is accessed. Appealing banner ads targeted to the specific location in the taxonomy, pertaining to the specific product, goods or services the customer is seeking, are intended to be the only clutter on the screen as the user progresses in using the system.

FIG. 5 shows a Buyer main menu page for the subject invention that, on the left side, lists main categories such as but not limited to Agricultural, Aircraft, Antiques, Automobiles, Boats, Heavy Equipment, Heavy Trucks, Industrial, Medical, Pickup Trucks, Recreational Vehicles, and Sport Utility Vehicles and Vans. Here the buyer has chosen the Automobiles category which is clicked on.

Hyperlinks located on the upper section of the page can be clicked onto for submitting an ad. The "Submit an Ad" will take the Buyer to a login page that request previously submitted information such as a password and username. After filling in the password and username, the system will automatically revert back to the same webpage that the Buyer was previously on, but now the mode of accessing the classification information is as a Seller, which in this example, is FIG. 6 and in FIGS. 25-29 described below.

FIG. 6 shows a Seller main menu page embodiment of the invention with main category headings, and will be described further in reference to FIGS. 26-30. Note that Seller web pages can have a Seller being listed in the backdrop of those pages in order to be able to tell the user which mode they are in.

FIG. 7 shows a second menu page for a Buyer having subcategory headings of the embodiment of FIG. 5. After a user clicks on one of the main category headings (in this example: Automobiles), this second page lists subcategories of Makes, Items, or Services, each of which can then be clicked on.

FIG. 8 shows a third menu page having type headings based on FIG. 5. (in this example, Makes). This third page lists different types of Automobiles. For example, American Cars, Antique Cars American, Antique Cars British, Antique Cars European, Antique Cars Foreign, Asian Cars, British Cars, European Cars, Exotic Cars, Hot Rods, Kit Cars, Limousines American, Limousines European, and Muscle Cars 1962-70. Clearly, sellers can place their goods in one or more appropriate places. On this page, a darkened type font is used to indicate there are goods under this type.

FIG. 9 shows a fourth menu page having subtype headings based on FIG. 5. (in this example, European Cars). The system automatically puts the previous heading picked on the page. This fourth page lists the subtypes of 2-door, 4-door, Convertible, Diesel, and Station Wagon.

FIG. 10 shows a fifth menu page having make headings based FIG. 5. (in this example, Diesel). The system modifies the header to read Automobiles:European Cars:Diesel. This fifth menu page lists makes of Audi, BMW, Mercedes, Volkswagon, and Volvo.

FIG. 11 shows a sixth menu page having model headings based on FIG. 5, subcategory headings in FIG. 1 (in this example. Mercedes). The system modifies the header to read Automobiles:European Cars:Diesel:Mercedes. This sixth menu page further lists the models of 190D, 190D Turbo, 300CD, 300D, 300SD, 300SDL, 300TD and 350D.

FIG. 12 shows a seventh page of the final ad list based on FIG. 5. Finally, the user can click on the desired type of mercedes and receive ad information or further modify the display, to sort and/or filter by geographical location, price, year, and the like.

FIG. 13 shows an eighth page of how the user can sort the ad list of FIG. 12.

FIGS. 14 and 15 show menu page embodiments of using the instant notification feature of the invention, previously described under V above, which can be opened by the button identified as Instant Notification shown on FIG. 12.

FIG. 16 shows an ad form page that a seller completes after passing through a similar series of pages as those shown by FIGS. 6 through 11. The location of goods information (Area Code, Zip Code, City, State, Country) is pre filled in from the sellers registration data. In FIG. 16 the seller has already reached the page having the header Automobiles:European Cars:Diesel:Mercedes:300D. The seller starts filling in fields such as but not limited to year, price, mileage, hours, serial number, color, description and can include the option to upload a photo from the seller's computer hard drive.

FIG. 17 shows a Buyer main menu page embodiment of the invention with main category headings as compared to FIG. 5 where the buyer picked the Automobiles category. In FIG. 17, the Buyer has chosen the Agriculture category.

FIG. 18 shows a second menu page having subcategory headings of the embodiment of FIG. 17 which lists the subcategory headers of Makes, Items, and Services. Here the buyer chooses Services.

FIG. 19 shows a third menu page having type headings based on FIG. 17, and lists different types of Agricultural services for example from Auctions, Breeding through Tracking, Interstate, needed.

FIG. 20 shows a fourth menu page having subtype headings based on FIG. 17 after choosing Trucking interstate, needed. This fourth page lists subtypes for example from Low Boy through Semi, refrigerated and Straight Truck, Livestock.

FIG. 21 shows a fifth menu page having from(origination) headings based on FIG. 17. FIG. 21 lists all states in the United States as originating locations and can include other locations such as but not limited to towns, cities, countries, and the like. Here, the invention is shown as being flexible to process diverse goods and services in one online classification system.

FIG. 22 shows a sixth menu page having to (destination) headings based on FIG. 17. FIG. 22 lists all states in the United States as destination locations and can include other locations such as but not limited to towns, cities, countries, and the like.

FIG. 23 shows a seventh page of the final ad list based on FIG. 17. FIG. 23 shows a service that is needed as compared to goods that were previously illustrated. Here, the buyer is viewing an ad that a seller previously posted requesting the service of Need Trucking to Orlando . . . Similar to ads for goods, the service ads can also be sorted. Also, an instant notification button, similar to the ones for goods (FIG. 5 and see description in reference to FIGS. 14-15), can be used on this page.

FIG. 24 shows a detailed description of one of the ads of FIG. 25. FIG. 25 shows an eighth page of how user can son the ad list of FIG. 24, similar to that shown for FIG. 13.

Figure 26:
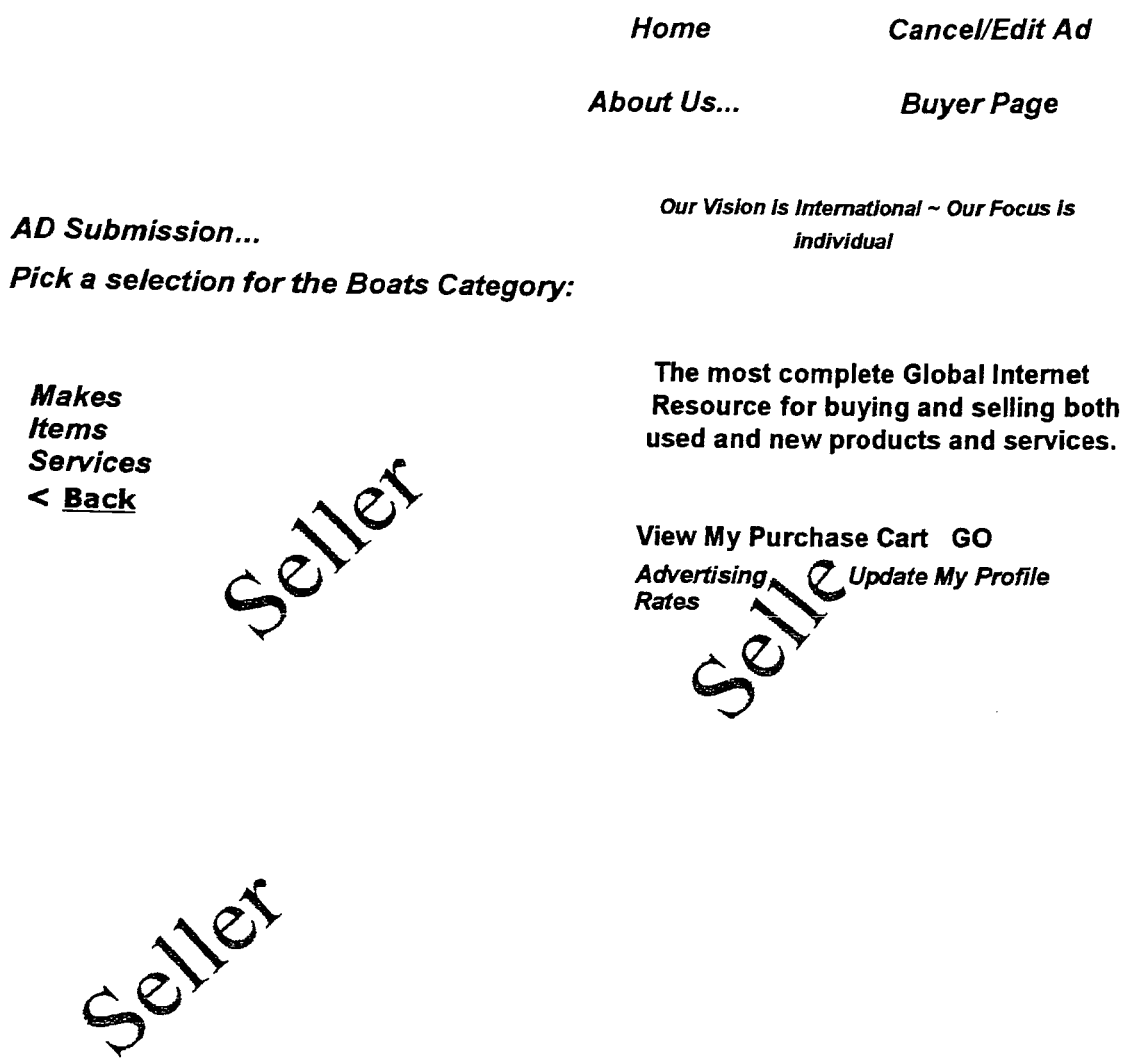
FIG. 26 shows a second menu page having first subcategory headings of the embodiment of FIG. 6 for picking the boats category.

FIG. 26 shows a second menu page having first subcategory headings of the embodiment of FIG. 6 for picking the boats category. FIG. 27 shows a third menu page having type headings based on selecting Makes in FIG. 26. FIG. 28 shows a fourth menu page having subtype headings based on selecting Powerboats. 43-53 feet in FIG. 27. FIG. 29 shows a fifth menu page having make headings based on selecting Motor Yacht in FIG. 28.

FIG. 30 shows a sixth page based on selecting CREATE OTHER in FIG. 29 for having a Seller submit an Ad that does not have a make heading in FIG. 29. The Seller user has the ability to create another make and model for the goods they wish to sell (also can be done for services). On the sixth page accessed in FIG. 29, the Seller can include information such as but not limited to Make, Model, Year, Price, Mileage, Hours(in-use), Serial No., Color, and a photograph that can be uploaded from the Seller's computer hard drive.

Although not described in detail, the user accessing the Items on the subcategory webpages. For example, in FIG. 7, clicking on Items will eventually pull up any parts and pieces on automobiles such as but not limited to engines, engine parts(crankshafts, blocks, heads, camshafts, and the like).

Also Items under Automobiles would pull up airconditioning parts, engines, engine pans (crankshafts, blocks, heads, camshafts, and the like, and including help wanted(mechanics, salesmen, and the like), real estate(carlots for sale and lease, paint and body shops for sale and lease, transmission shops for sale and lease, and the like). Items is the catch all subcategory for miscellaneous subcategories that do not come under Makes and Services. Thus, Buyers and Sellers can access goods and services for all types of Makes, Items, and Services.

Although the embodiments describe the invention being used for goods and services, the invention can be used for any information having an orderly classification of objects and the like.

For example, main categories can include areas of study such as Biology, Chemistry, Engineering, Law and Medicine, and the like. If Engineering is chosen, the subcategory headings could include educational institutions such as 2-Year, Community College, Trade School, Undergraduate, Graduate, and Post Graduate(PHD). If Undergraduate School subcategory is chosen, the types headings could include types of engineering such as Aerospace, Biomedical, Chemical, Electrical, Industrial, Mechanical, and the like. If Electrical Engineering is picked, the subtype headings could include an alphabetical listing of the geographical regions of the Undergraduate Schools for Electrical Engineering such as but not limited to Asia, Europe, through Northeast United States. Southeast United States, and the like. Next, the user choosing a geographical region could get a list of educational institutions in those locations, which can be further sorted. Further subtypes can include courses of study, curriculum requirements, and the like. Instant Notification can occur when a scholarship is offered based on a student's requested aid need. Student acceptance, coming off a waiting list for acceptance can also come under Instant Notification as previously described.

Other orderly classification information of objects that can use the invention can include cataloging of goods from a single online department store. Main category headings can include Apparel, Appliances, Electronics, Furniture, Gardening, Hardware, and the like. Subcategory headings under Furniture can include Bathroom, Bedroom, Dining Room, Livingroom, Kitchen, and the like. Picking Bedroom, would give a listing of different of types which can include Colonial, Contemporary, French Provincial, Victorian, and the like. Picking Contemporary would give a subtype list of furniture for the Contemporary Bedroom such as but not limited to Armoire, Bed, Dresser, Mirror, Nightstand, and the like. Picking on Dresser, would give a subtype list of two drawer, four drawer, and the like. Picking on two drawer would give a further subtype list of color which could include for example, Black, Cherry, Maple, Oak, White, and the like. Final lists can include photograph picture, price, dimensions, availability. Instant notification can include when order comes in, when item comes in stock, and the like.

Further classification information that can use the invention can include scientific applications such as Zoology, Plants, Genetic Mapping and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of accessing classification information of data, objects, or items from chosen classifications on a recursive web based system or application through a device that supports accessing and viewing a web based system or application, until a finite selection point is achieved for the chosen classifications without inputting any search queries, comprising the steps of:

providing a device that supports accessing and viewing a web based system or application that is selected from at least one of a conventional computer, laptop, PDA(personal digital assistant) device, cell phone, pager, and any other wireless or non-wireless device that supports accessing and viewing a web based system or application, providing a recursive web based system or application having data, objects, or items from different classifications, wherein the different data, objects, or items are listed according to classifications chosen, providing menu pages that lead to different data, objects, or items by classifications from like and unlike categories, wherein the menu page sequencing to access and view the different data, objects, or items by classifications is established by a knowledge engineer of a category, accessing and viewing the web based system or application having a first main menu page of category headings of the data, objects, or items from the different classifications by a device that supports accessing and viewing a web based system or application;

first selecting and viewing at least one of the category headings on the first main menu page on a device that supports accessing and viewing a web based system or application;

accessing and viewing a second menu page having first subcategory headings from the first selecting step on the device that supports accessing and viewing a web based system or application;

second selecting and viewing at least one of the first subcategory headings on the device that supports accessing and viewing a web based system or application;

accessing and viewing a third menu page having second subcategory headings from the second selecting step on the device that supports accessing and viewing a web based system or application, the second subcategory headings being solely listed in a single vertical column on the third menu page with separate second subcategory headings solely on each line;

third selecting and viewing at least one of the second subcategory headings by scrolling down the single vertical column on the third menu page on the device that supports accessing and viewing a web based system or application; and repeating accessing and selecting and viewing by solely scrolling down only one single vertical column on each successive menu page on the device that supports accessing and viewing a web based system or application until the end of a menu series to a finite selection list of the classification that is listed in a single vertical column of selected data, objects, or items from chosen classification, wherein interaction of the accessing of the first page, the second page, the third page, and the first selecting, the second selecting, and the third selecting are navigated on the device that supports accessing and viewing a web based system or application without inputting any search queries;

viewing the single column of the finite selection list of the classification by scrolling down the finite selection list of the selected data, objects, or items from the chosen classification on the device that supports accessing and viewing a web based system or application, without inputting of any search queries;

requesting an unlisted classification data, object, or item from the web based system or application, the unlisted data, object, or item being selected from the chosen classification;

notifying by generating instant notification to a device chosen to receive the notification when the unlisted data, object, or item has been placed in the chosen classification of the web based system or application, which matches the unlisted data, object, or item;

providing a device to receive notifications that is selected from at least one of a conventional computer, laptop, PDA(personal digital assistant) device, cell phone, pager, and any other wireless or non-wireless device that can receive notifications, where notifications include but are not limited to: e-mail, text message, or paging, and allowing a response to the notification of the unlisted data, object, or item placed in the chosen classification, such as but not limited to: purchasing, updating, registering for, approving information.

2. The method of accessing information organized by classifications, of claim 1, wherein the steps of accessing of the first page, the second page, the third page, and the first selecting, the second selecting and the third selecting include at least one of: classification menus navigated to each accessing and selecting step by point and click, classification menus navigated to each accessing and selecting step by voice command, and classification menus navigated to each accessing and selecting step by combination of point and click and voice command, on the web based system or application.

3. The method of accessing information organized by classifications, of claim 1, wherein the category headings are descriptive entrance points for accessing like and unlike information or objects having an orderly classification of data, objects or items, such as but not limited to: agriculture, aircraft, antiques, automobiles, boats, heavy equipment, heavy trucks, industrial, medical, pickup trucks, recreational vehicles, sport utility vehicles, and vans; and, the information or objects having an orderly classification of data, objects or items includes but are not limited to: goods, services, course listings, genetic mapping, Biology, Chemistry, Engineering, Law and Medicine.

4. The method of accessing information organized by classifications, of claim 1, wherein the first subcategory headings include:

headings for: makes, items, and services.

5. The method of accessing classification information of data, objects, or items from chosen classifications of claim 1, further comprising the steps of:

solely filtering and sorting the finite selection list of the classification into a filtered and sorted list, wherein: chosen classification information is filled in automatically minimizing human error, viewing the filtered and sorted list, wherein filtering and sorting only occurs at the finite selection, and new data, objects, or items from chosen classification in the finite selection list are identified by a unique color; a finite selection list containing line items with only key details for each data, object, or item from the chosen classification, whereby the finite selection list is accessed efficiently by the device used to access the web based system or application, and choosing a line item in the finite selection list to view further details.

6. The method of accessing classification information of data, objects, or items from chosen classifications of claim 1, further comprising steps of:

allowing dynamic update of at least one of the category headings and the first subcategory headings by steps of:

adding and deleting from at least one of the category headings, and first subcategory headings through the device used to access the web based system or application, and expanding listing of viewable data, objects, and items both horizontally and vertically at all levels of classifications through the device used to access the web based system or application.

7. A method of accessing and placing classification information of data, objects, or items from chosen classifications on a web based system or application, comprising the steps of:

accessing a web based system or application having a first main menu page of category headings of the data, objects, or items from the different classifications, where the method is "to view" or "add to" the data, objects, or items in the classifications using the device that supports accessing a web based system or application;

first selecting at least one of the category headings on the first main menu page on a device that supports accessing a web based system or application;

accessing a second menu page having first subcategory headings from the first selecting step on the device that supports accessing a web based system or application;

second selecting at least one of the first subcategory headings on the device that supports accessing a web based system or application;

accessing a third menu page having second subcategory headings from the second selecting step on the device that supports accessing a web based system or application;

third selecting at least one of the second subcategory headings by scrolling down the single vertical column on the third menu page on the device that supports accessing and viewing a web based system or application;

repeating accessing and selecting and viewing by solely scrolling down only one single vertical column on each successive menu page on the device that supports accessing a web based system or application until a finite selection list of data, objects, or items in the chosen classification is reached, and determining the status of the method from "to view" to "add to" the data, objects, or items in the chosen classifications or the intent from "add to" to "view" the data, objects, or items in the classifications at the finite selection list, and eliminating having to again enter information on at least the first selected category headings and the second selected subcategory headings.

8. The method of accessing and placing classification information of data, objects, or items from chosen classifications on a web based system or application of claim 7, wherein the method is "to view" the finite selection list of the data, objects, or items in the chosen classifications is switched to "to add", and including the step of:

filling in only extra information on a listing for a new data, object, or item in the chosen classification on the web based system or application since the new listing already and automatically was updated to include at least the first selected category headings and the second selected subcategory headings.

9. A method of accessing and placing classification information of data, objects, or items from chosen classifications on a web based system or application, comprising the steps of:

accessing a web based system or application having a first main menu page of category headings of the data, objects, or items from the different classifications, wherein the method is "to view" or "add to" the web based system or application using the device that supports accessing a web based system or application;

first selecting at least one of the category headings on the first main menu page on a device that supports accessing a web based system or application;

accessing a second menu page having first subcategory headings from the first selecting step on the device that supports accessing a web based system or application;

second selecting at least one of the first subcategory headings on the device that supports accessing a web based system or application;

accessing a third menu page having second subcategory headings from the second selecting step on the device that supports accessing a web based system or application;

third selecting at least one of the second subcategory headings by scrolling down the single vertical column on the third menu page on the device that supports accessing and viewing a web based system or application;

repeating accessing and selecting and viewing by solely scrolling down only one single vertical column on each successive menu page on the device that supports accessing a web based system or application until a finite selection list of data, objects, or items in the chosen classification is reached, and selectively placing a banner on limited menu pages after the first main menu page, so the banners are viewed only on the selected subsequent menu pages of the web based system or application on the device that supports accessing a web based system or application.

10. The method of accessing and placing classification information of data, objects, or items from chosen classifications on a web based system or application of claim 9, wherein the selectively placing step further includes the step of:

determining placement of the banners on the selected menu pages to the web based system or application viewing and placing a banner only associated with the data, objects, and items from classifications chosen.

11. The method of accessing classification information of data, objects, or items from chosen classifications of claim 1, wherein the notification step is further includes: the notification request placed at the end of a menu series whereby: minimizes human error for the notification request, chosen classification information is filled in automatically;

allows notification to be personalized in alphanumeric terms allowing devices that have limitations on text string size to be used to receive notification; and viewing and editing notifications wherein: a flag is displayed next to notifications that have responses not viewed.

12. The method of accessing classification information of data, objects, or items from chosen classifications on a recursive web based system or application of claim 1, wherein the recursive web based system or application is includes:

a recursive software engine and a database.

13. The method of accessing classification information of data, objects, or items from chosen classifications on a recursive web based system or application of claim 12, wherein the database consists of two main components:

spreadsheet formatted table(s) that contain the classification structure for like and unlike categories, and node-based database that is generated from the spreadsheet-like formatted table(s).

14. The method of accessing classification information of data, objects, or items from chosen classifications on a recursive web based system or application of claim 13, wherein the spreadsheet formatted table(s) includes:

the classification structures for like and unlike categories that drives the menu series produced to access and view data, objects, or items of chosen classifications; and a control-id mechanism that handles and controls the processing behaviors of like, unlike, sequential, and non-sequential data, objects, and items across like and unlike categories and classifications.

15. The method of accessing classification information of data, objects, or items from chosen classifications on a recursive web based system or application of claim 14, wherein the node-based database that is generated from the spreadsheet formatted table(s):

contains classification data for like and unlike categories generated from the spreadsheet-like formatted table(s);

interfaces with the recursive software engine to generate the menu series required to access data, objects, or items of chosen classifications;

expands when further classification of data, objects, or items are added using a device that supports access to a web based system or application;

reduces when classification of data, objects, or items are removed using a device that supports access to a web based system or application;

provides a node-based method for reverse movement through the menu series for data, objects, or items of chosen classification;

provides a node-based reference to associate a notification request with the addition of the sought after data, objects, or items of chosen classification;

provides a node-based reference to match the data, objects, or items with the chosen classification;

provides a node-based reference to match the data, objects, or items to the owner; where an owner placed the data, objects, or items in to the classifications;

provides a node-based reference to match a notification request and response to the owner; where an owner placed the notification request for an unlisted data, object, or item of a chosen classification; and provides a node-based reference to owner information, where an owner placed information into the web based system or application.

16. The method of accessing classification information of data, objects, or items from chosen classifications on a recursive web based system or application of claim 15, wherein the control id mechanism that handles and controls processing behaviors includes:

classification expansion, classification reduction, banner placement, identify next step after menu selection, identify the information required to add new data, object, or item for a chosen classification, wherein the method is used for a single classification, across unlike classifications, or across like classifications.

17. The method of accessing classification information of data, objects, or items from chosen classifications on a recursive web based system or application of claim 16, wherein the recursive software engine includes:

interfaces with the node-based database to build the menu series for like and unlike categories of data, objects, or items from chosen classifications;

interfaces with the node-based database to apply and process the behaviors to like and unlike categories of data, objects, or items from chosen classifications;

interfaces with the node-based database for administration of data, objects, items, requests, responses associated with an owner, where an owner placed information into the web based system or application; and presents the menu series and behaviors needed for the like and unlike categories of data, objects, or items from chosen classifications without having knowledge of the data content.

18. A method of accessing classification information of different advertisements from different sellers on a web based system through customer display devices, until a finite selection point is achieved by users without inputting any search queries, the users include both buyers and sellers, each user having an interest in at least one of: a good, and a service, comprising the steps of:

providing a customer display device;

providing a remote web site having advertisements from different sellers, wherein the advertisements include listed advertisements of different goods by different sellers, and listed advertisements of different services by different, each of the sellers;

connecting to the remote web site via the world wide web, solely through existing wireless telephone lines, by a customer using the customer display device from a location remotely located away from the remote web site, the customer adapted to include a buyer;

accessing and viewing the remote web site having a first main menu page of category headings of the advertisements from the different sellers by the customer display device solely through the existing wireless telephone lines at the location remotely located away from the remote web site;

first selecting and viewing at least one of the category headings on the first main menu page on the customer owned display device;

accessing and viewing a second menu page having first subcategory headings from the first selecting step on the customer display device;

second selecting and viewing at least one of the first subcategory headings on the customer display device;

accessing and viewing a third menu page having second subcategory headings from the second selecting step on the customer display device, the second subcategory headings being solely listed in a single vertical column on the third menu page with separate second subcategory headings solely on each line;

third selecting and viewing at least one of the second subcategory headings by scrolling down the single vertical column on the third menu page on the customer display device;

repeating accessing and selecting and viewing by solely scrolling down only one single vertical column on each successive menu page on the display device, until the buyer reaches an end of a menu series to a finite selection list of a classification that is listed in a single vertical column of selected advertisements from the advertisements from the different sellers, wherein interaction of the accessing of the first page, the second page, the third page, and the first selecting, the second selecting and the third selecting are navigated on the customer display device without inputting any search queries;

viewing the single column of the finite selection list of the classification by scrolling down the finite selection list of the selected advertisements from the advertisements from the different sellers on the customer display device, without the inputting of any search queries; and requesting an unlisted item from the web based system by the buyer, the unlisted item being selected from one of: a selected good and a selected service.

19. The method of claim 18, further comprising the steps of:

instantly notifying the buyer through the customer display device, when the unlisted item has been placed by a seller to the web based system, which matches the unlisted item; and allowing the buyer to purchase the unlisted item from the seller.

20. The method of claim 18, wherein the customer display device includes:

a handheld display device that is selected from at least one of a pager, a cell phone, and a PDA(personal digital assistant).

* * * * *